(12) United States Patent
Jang

(10) Patent No.: US 10,865,656 B2
(45) Date of Patent: Dec. 15, 2020

(54) TURBINE BLADE RING SEGMENT, AND TURBINE AND GAS TURBINE INCLUDING THE SAME

(71) Applicant: DOOSAN HEAVY INDUSTRIES & CONSTRUCTION CO., LTD., Changwon-si (KR)

(72) Inventor: Yun Chang Jang, Gimhae-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 100 days.

(21) Appl. No.: 16/129,739

(22) Filed: Sep. 12, 2018

(65) Prior Publication Data
US 2019/0112944 A1  Apr. 18, 2019

(30) Foreign Application Priority Data
Oct. 17, 2017  (KR) .......................... 10-2017-0134455

(51) Int. Cl.
| F01D 25/14 | (2006.01) |
| F02C 3/073 | (2006.01) |
| F01D 11/08 | (2006.01) |
| F01D 25/12 | (2006.01) |

(52) U.S. Cl.
CPC .............. *F01D 25/14* (2013.01); *F01D 11/08* (2013.01); *F01D 25/12* (2013.01); *F02C 3/073* (2013.01); *F05D 2240/11* (2013.01); *F05D 2260/201* (2013.01); *F05D 2260/203* (2013.01); *F05D 2260/204* (2013.01)

(58) Field of Classification Search
CPC .......... F01D 25/14; F01D 11/24; F01D 11/20; F01D 11/14
See application file for complete search history.

(56) References Cited

U.S. PATENT DOCUMENTS

| 7,665,955 | B2 * | 2/2010 | Liang | ....................... F01D 11/24 |
| | | | | 415/115 |
| 8,684,662 | B2 * | 4/2014 | Jiang | ....................... F01D 11/08 |
| | | | | 415/115 |
| 8,727,704 | B2 | 5/2014 | Lee et al. | |

FOREIGN PATENT DOCUMENTS

| JP | 1999-022411 A | 1/1999 | |
| JP | 11022411 A | * 1/1999 | .............. F01D 11/24 |

* cited by examiner

*Primary Examiner* — Igor Kershteyn
*Assistant Examiner* — Juan G Flores
(74) *Attorney, Agent, or Firm* — Invenstone Patent, LLC

(57) ABSTRACT

A turbine blade ring segment includes an inner panel mounted to an inner surface of a turbine casing, the inner panel including a plurality of flow holes for supplying cooling air from an outside of the turbine casing; and an outer panel disposed on one surface of the inner panel, the outer panel including a plurality of air passages communicating with the flow holes formed in the inner panel. The passages include a first flow passage formed in a central portion of the outer panel to guide the supplied cooling air in a flow direction of the combustion gas, a second flow passage formed in the outer panel separately from the first flow passage to guide the supplied cooling air in the flow direction of the combustion gas, and a third flow passage communicating with the second flow passage to feed the supplied cooling air to the second flow passage.

13 Claims, 7 Drawing Sheets

Related Art
[FIG. 1]
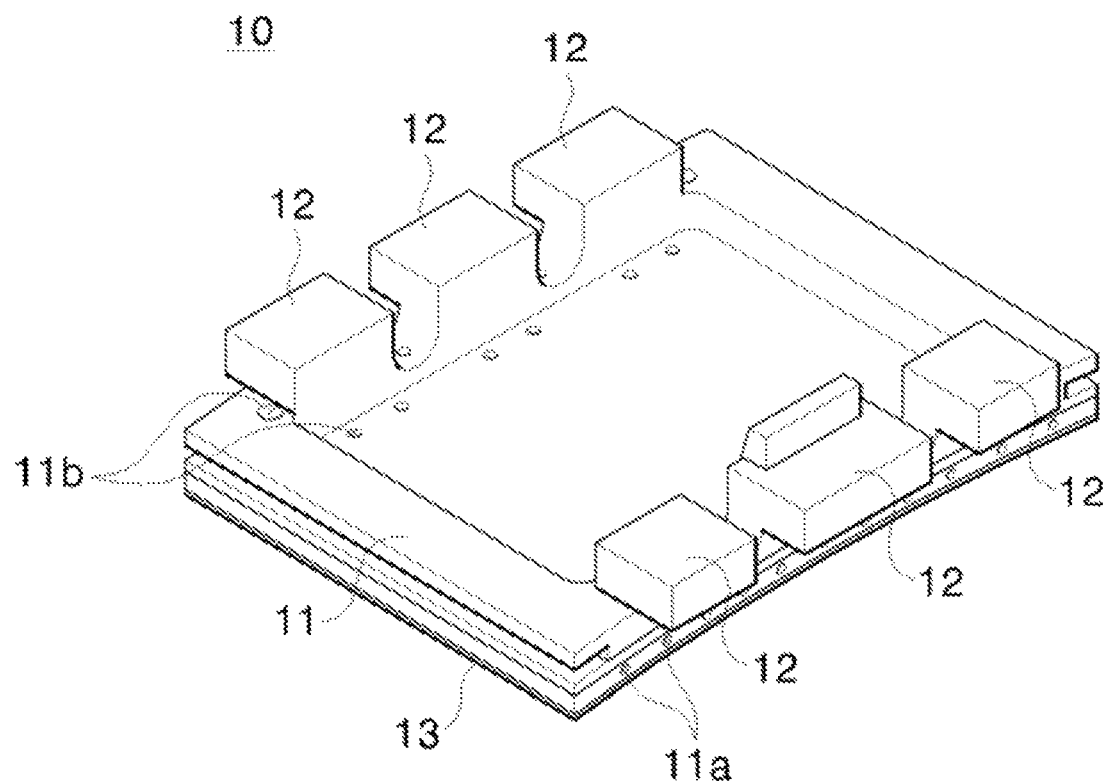

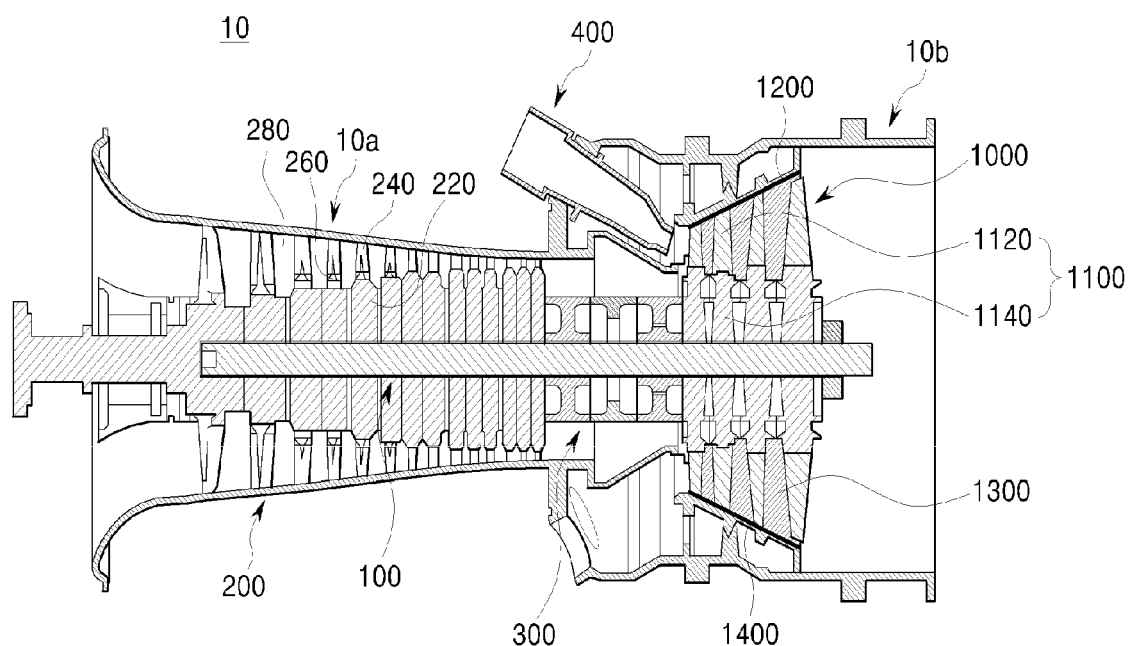
[FIG. 2]

[FIG. 3]
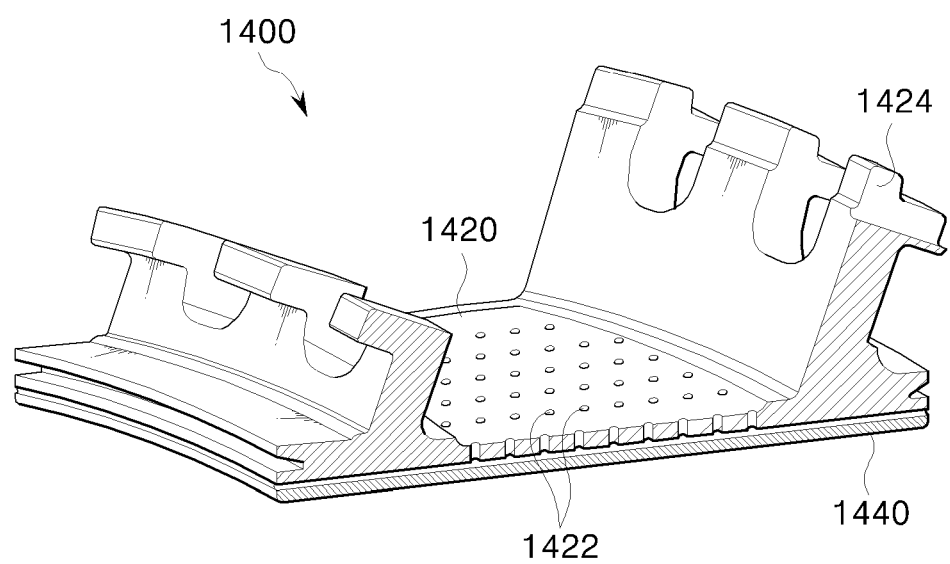

[FIG. 4]
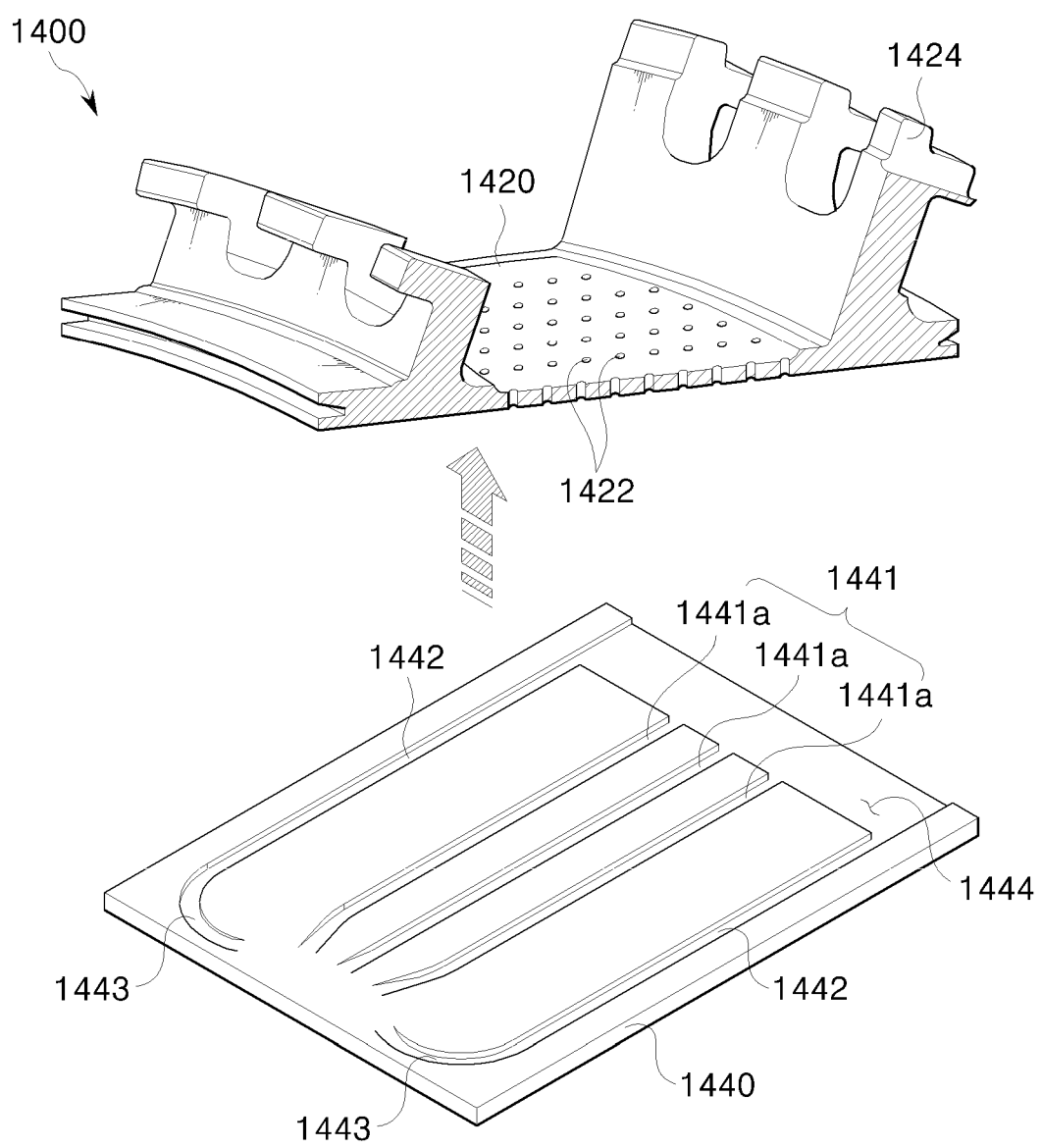

[FIG. 5]
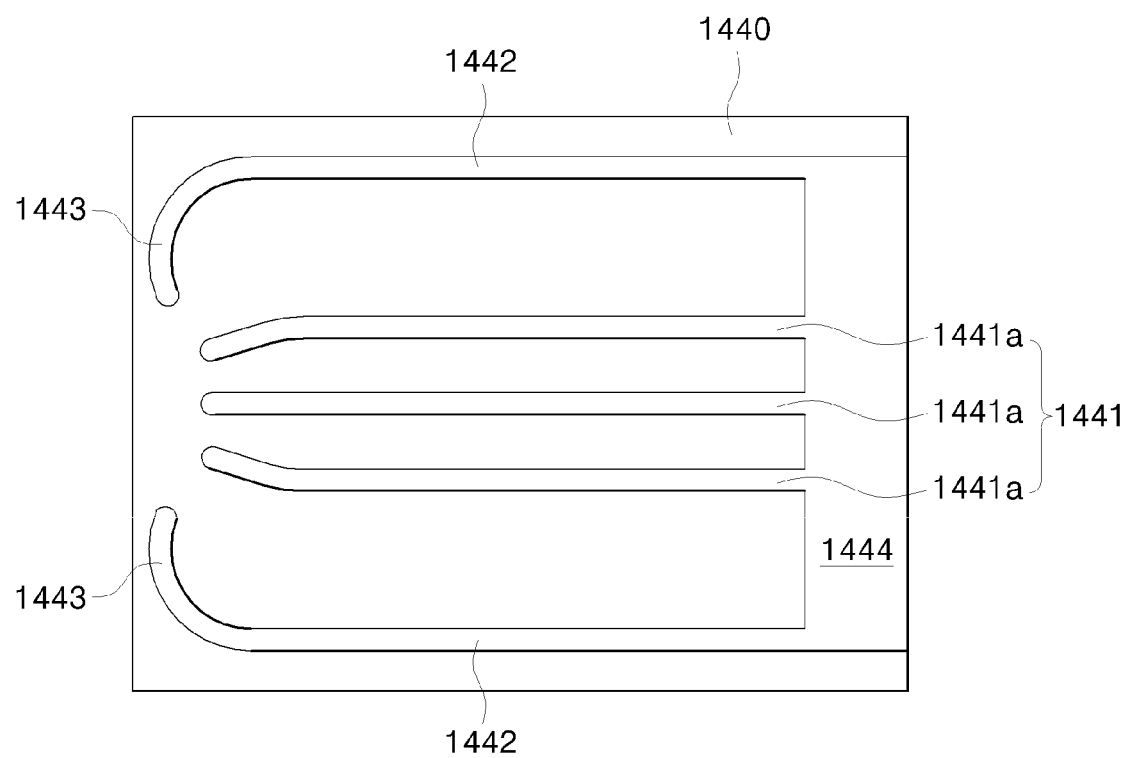

[FIG. 6]
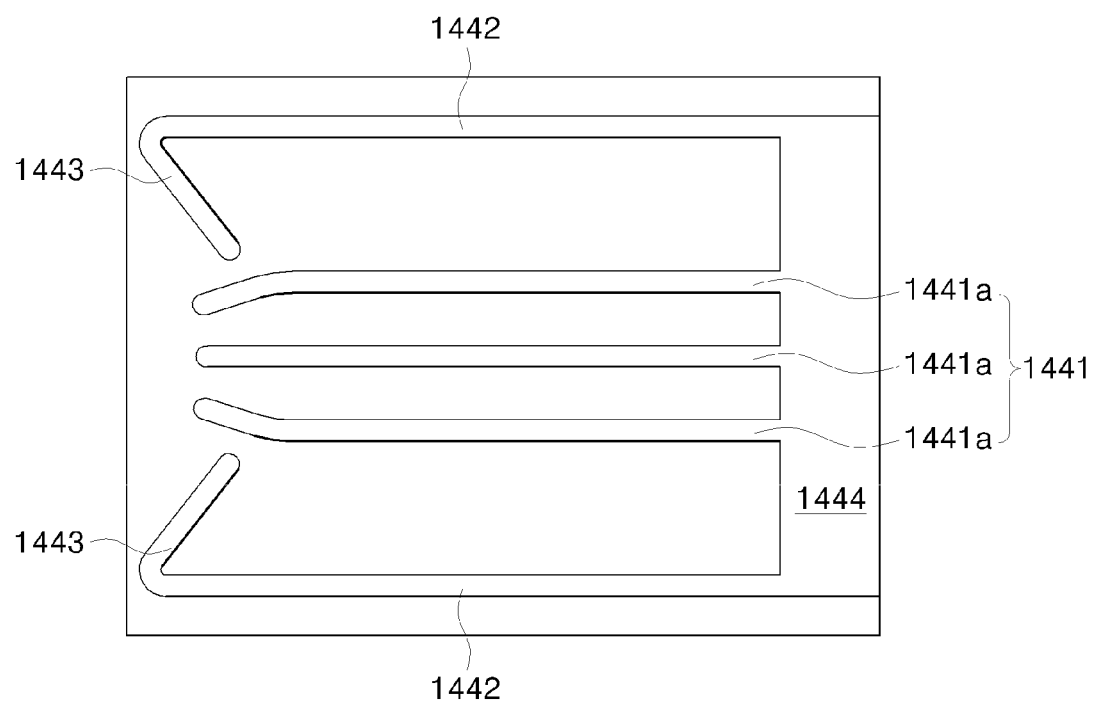

【FIG. 7】
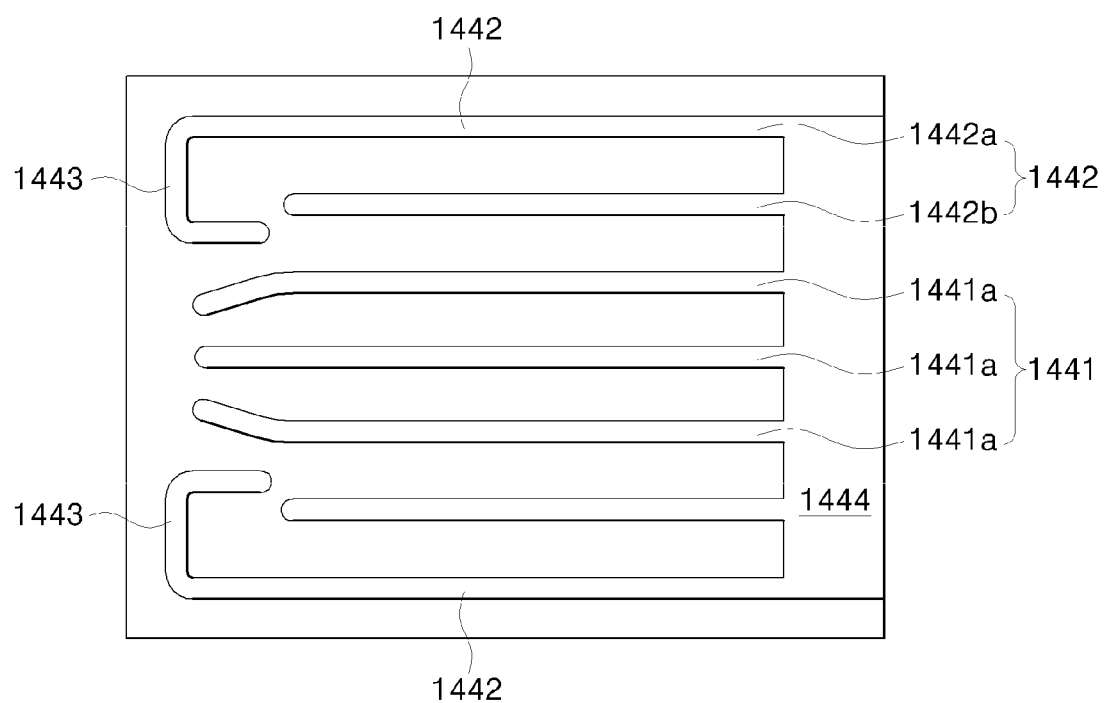

TURBINE BLADE RING SEGMENT, AND TURBINE AND GAS TURBINE INCLUDING THE SAME

CROSS-REFERENCE TO RELATED APPLICATIONS

This application claims the benefit of Korean Patent Application No. 10-2017-0134455, filed on Oct. 17, 2017, in the Korean Intellectual Property Office, the disclosure of which is incorporated herein in its entirety by reference.

BACKGROUND OF THE DISCLOSURE

Field of the Disclosure

Exemplary embodiments of the present disclosure relate to a turbine blade ring segment, and a turbine and a gas turbine including the turbine blade ring segment, and more particularly, to a turbine blade ring segment mounted in a turbine casing and provided with an improved structure to prevent leakage of combustion gas and to cool the turbine casing.

Description of the Related Art

A turbine is a machine which generates rotating force from impulsive force or reaction force using the flow of compressive fluid such as steam or gas. The turbine is classified into a steam turbine using steam, a gas turbine using high-temperature combustion gas, and so forth.

The gas turbine chiefly includes a compressor, a combustor, and a turbine. The compressor includes an air inlet into which air is introduced, and a plurality of compressor vanes and a plurality of compressor blades which are alternately provided in a compressor casing. The combustor is configured to supply fuel to air compressed by the compressor and ignite the fuel-air mixture using a burner, thus generating high-temperature and high-pressure combustion gas. The turbine includes a plurality of turbine vanes and a plurality of turbine blades which are alternately arranged in a turbine casing.

Additionally, a rotor is disposed so as to pass through central portions of the compressor, the combustor, the turbine, and an exhaust chamber. Opposite ends of the rotor are rotatably supported by bearings. A plurality of disks are fixed to the rotor, and the blades are coupled to the corresponding disks, respectively. A driving shaft of a generator or the like is coupled to the end of the rotor that is adjacent to the exhaust chamber.

The gas turbine does not have a reciprocating component such as a piston of a four-stroke engine. Therefore, mutual friction parts such as a piston-and-cylinder are not present, so that there are advantages in that there is little consumption of lubricant, the amplitude of vibration is markedly reduced unlike a reciprocating machine having high-amplitude characteristics, and high-speed driving is possible.

In the operation of a gas turbine as above, air compressed by the compressor is mixed with fuel, the mixture is combusted to generate high-temperature combustion gas, and the generated combustion gas is discharged to the turbine. The discharged combustion gas passes through the turbine vanes and the turbine blades and generates rotating force, by which the rotor is rotated.

An appropriate set of blade ring segments is installed in each of the compression and turbine sections. In particular, a turbine blade ring segment is installed in the turbine section so as to prevent leakage of high-temperature and high-pressure combustion gas for rotating the rotor and consequently increase the efficiency of the gas turbine.

Such a blade ring segment enclosing a periphery of the rotating blades may be installed in the casing of the gas turbine that houses the blades. Here, one surface of the blade ring segment that faces an internal space of the casing is exposed to high-temperature and high-pressure combustion gas, so that a comparatively high thermal load may be applied to the one surface of the blade ring segment. The blade ring segment may be damaged by the thermal load. To prevent such damage, a plurality of cooling passages are formed in the blade ring segment. Research and development on a cooling structure having an improved cooling efficiency to prevent the damage due to thermal load have continued.

As a technique related to this, a conventional blade ring segment for a gas turbine was proposed in Korean Patent Registration No. 1623303.

SUMMARY OF THE DISCLOSURE

An object of the present disclosure is to provide a turbine blade ring segment capable of enhancing cooling efficiency by improving a flow passage along which cooling air supplied from the outside flows, and a turbine and a gas turbine including the turbine blade ring segment.

Another object of the present disclosure is to provide a turbine blade ring segment configured such that flow passages of cooling air do not overlap each other, thus solving a problem of reduction in cooling efficiency due to a cross-flow phenomenon, and a turbine and a gas turbine including the turbine blade ring segment.

Yet another object of the present disclosure is to provide a turbine blade ring segment in which cooling air flows over an overall surface of an outer panel along a flow direction of combustion gas and in which vortex currents occur in the cooling air that flows around a rear end of the outer panel, thus further enhancing the cooling efficiency, and a turbine and a gas turbine including the turbine blade ring segment.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a turbine blade ring segment may include an inner panel configured to be mounted to an inner surface of a turbine casing for receiving turbine blades to be rotated by combustion gas supplied from a combustor, the inner panel including a plurality of flow holes for supplying cooling air from an outside of the turbine casing; and an outer panel disposed on one surface of the inner panel, the outer panel including a plurality of air passages for communicating with the flow holes formed in the inner panel, the plurality of air passages including a first flow passage formed in a central portion of the outer panel and configured to guide the supplied cooling air in a flow direction of the combustion gas, a second flow passage formed in the outer panel separately from the first flow passage and configured to guide the supplied cooling air in the flow direction of the combustion gas, and a third flow passage communicating with the second flow passage to feed the supplied cooling air to the second flow passage.

The plurality of flow holes may be arranged throughout the one surface of the inner panel, and the plurality of air passages may include a plurality of flow grooves each including one end formed at a position corresponding to a separate area of the one surface of the inner panel.

The cooling air guided by the first flow passage may be supplied to the first flow passage through centrally disposed flow holes among the plurality of flow holes. The cooling air guided by the second flow passage may be supplied to the second flow passage through edge-disposed flow holes among the plurality of flow holes. The cooling air fed by the third second flow passage may be supplied to the third flow passage through a portion of the centrally disposed flow holes.

The first flow passage may include a plurality of flow grooves each including one end formed at a position corresponding to the flow holes formed in a central portion of the inner panel and another end communicating with a vortex forming space. The first flow passage may further include a curved flow passage formed at the one end, and each flow groove may include an elongated groove arranged along the flow direction of the combustion gas and connected between the curved flow passage and the vortex forming space.

The second flow passage may be formed adjacent to a side edge of the outer panel. The third flow passage may include a first end formed at a position corresponding to centrally disposed flow holes among the plurality of flow holes, and a second end communicating with the second flow passage. The third flow passage may be formed to be inclined in a direction opposite to the flow direction of the combustion gas. The third flow passage may include at least one of an approximately triangular configuration and an approximately rectangular configuration.

The second flow passage may include at least one flow groove including one end formed at a position corresponding to the flow holes formed in an edge portion of the inner panel and another end communicating with a vortex forming space. The at least one flow groove may include a plurality of second flow grooves to increase the area of the outer panel that communicates with the edge-disposed flow holes, and at least one of the plurality of second flow grooves may be disposed laterally outward from an end of the third flow passage, and may not communicate with the third flow passage.

The plurality of air passages may respectively communicate with a vortex forming space formed in a rear end of the outer panel.

In accordance with another aspect of the present disclosure, there is provided a turbine configured to pass combustion gas supplied from a combustor through an interior of the turbine to generate a driving force. The turbine may include a turbine rotor configured to be rotated by the combustion gas, the turbine rotor including a plurality of turbine disks and a plurality of turbine blades coupled to an outer surface of each of the plurality of turbine disks; a turbine casing for housing the turbine rotor; and the above turbine blade ring segment.

In accordance with yet another aspect of the present disclosure, there is provided a gas turbine including a compressor to draw air and compress the drawn air; a combustor to generate combustion gas by combusting fuel mixed with the compressed air; and the above turbine.

In a turbine blade ring segment and a turbine and a gas turbine including the turbine blade ring segment in accordance with the present disclosure, a flow passage along which cooling air supplied from the outside flows is improved so that cooling air can flow over an overall surface of an outer panel along a flow direction of combustion gas without collision, and vortex currents occur in the cooling air that flows around a rear end of the outer panel. Consequently, the cooling efficiency can be further enhanced.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a perspective view of a general blade ring segment;

FIG. 2 is a schematic cross-section of a gas turbine to which a turbine blade ring segment in accordance with an embodiment of the present disclosure may be applied;

FIG. 3 is a perspective view of a turbine blade ring segment in accordance with an embodiment of the present disclosure;

FIG. 4 is an exploded perspective view of the turbine blade ring segment shown in FIG. 3;

FIG. 5 is a plan view of an outer panel shown in FIG. 4; and

FIGS. 6 and 7 are plan views respectively illustrating modifications of the outer panel shown in FIG. 4.

DESCRIPTION OF SPECIFIC EMBODIMENTS

Hereinafter, a turbine blade ring segment, and a turbine and a gas turbine including the turbine blade ring segment in accordance with the present disclosure will be described with reference to the accompanying drawings.

Referring to FIG. 1, a general blade ring segment 1 may include a shielding part 2, a coupling part 4, and a coating layer 6. The shielding part 2 has a plate shape of a predetermined thickness and seals the interior space of a casing which houses blades of a gas turbine. The coupling part 4 is formed on a first surface of the shielding part 2 and is configured to be coupled to the casing. The coating layer 6 is formed on a second surface of the shielding part 2 to protect the shielding part 2 from heat present in the interior space in the casing.

The shielding part 2 of the blade ring segment 1 is provided in the form of a plate and has a plurality of cooling passages 2a, and a plurality of air supply holes 2b formed to supply cooling air to the plurality of cooling passages 2a. Each cooling passage 2a is formed to have a predetermined length along a longitudinal direction of the shielding part 2. Each air supply hole 2b is disposed at a position adjacent to an end of the corresponding cooling passage 2a.

The cooling passage 2a extends from a first end of the shielding part 2 toward a second end thereof which faces away from the first end. Here, the length of the cooling passage 2a (extension length) does not extend to the second end of the shielding part 2. The air supply hole 2b is disposed at a position corresponding to a distal end of the cooling passage 2a with respect to the longitudinal direction of the cooling passage 2a. Therefore, the conventional blade ring segment 1 is problematic in that only a portion of the blade ring segment 1 that corresponds to the extension length of the cooling passages 2a is cooled, so that a thermal load due to high heat may be applied to the end of the blade ring segment 1 in which the cooling passages 2a are not disposed.

To solve the foregoing problem, the design of the blade ring segment 1 has been changed such that the cooling passages 2a communicate with each other to cover the overall area of the shielding part 1. However, cooling air that flows through the communicating cooling passages 2a makes collisions, whereby the cooling efficiency may be reduced. A blade ring segment in accordance with an embodiment of the present disclosure may solve the problem of reduction in cooling efficiency due to collisions of cooling air.

Referring to FIG. 2, a gas turbine 10 in accordance with the present disclosure includes a tie rod 100, a compressor 200, a torque tube 300, a combustor 400, and a turbine 1000. The tie rod 100 is a rod-shaped member installed so as to pass through a central portion of the gas turbine 10. The tie rod 100 functions to couple the compressor 200 and the turbine 1000 with each other.

The gas turbine 10 is provided with a housing 10a. A diffuser 10b is provided to a rear portion of the housing 10a so that combustion gas that has passed through the turbine 1000 is discharged out of the gas turbine 10 through the diffuser 10b. The combustor 400, which receives compressed air and performs a combustion operation, is disposed ahead of the diffuser 10b.

Hereinbelow, description will be made based on the flow of air. The compressor 200 is disposed at an upstream side of the housing 10a, and the turbine 1000 is disposed at a downstream side of the housing 10a. It is preferable that the torque tube 300 be disposed between the compressor 200 and the turbine 1000 as a torque transmission member for transmitting rotational torque generated from the turbine 1000 to the compressor 200.

The compressor 200 is provided with a plurality (e.g., fourteen) of compressor disks 220. The compressor disks 220 are coupled by the tie rod 100 such that they do not axially separate from each other.

The compressor disks 220 are arranged along the axial direction of the tie rod 100 passing through approximately central portions of the compressor disks 220. Here, facing surfaces of neighboring compressor disks 220 are compressed onto each other by the tie rod 100, whereby the compressor disks 220 cannot rotate relative to each other.

A plurality of compressor blades 240 are radially coupled to an outer circumferential surface of each compressor disk 220. Each of the compressor blades 240 includes a compressor blade root member 260 by which the compressor blade 240 is coupled to the compressor disk 220.

Compressor vanes 280 fixed to the housing 10a are disposed between the compressor disks 220. The compressor vanes 280 are fixed and do not rotate, unlike the compressor disks 220. Each compressor vane 280 functions to align the flow of compressed air that has passed through the compressor blades 240 of the compressor disk 220 disposed at an upstream side, and guide the compressed air to the compressor blades 240 of the compressor disk 220 disposed at a downstream side.

A coupling scheme of the compressor blade root member 260 is classified into a tangential type and an axial type. This may be selected depending on a required structure in the gas turbine to be used, and may be embodied in a well-known dovetail or fir-tree type structure. In some cases, rather than using the above coupling scheme, the compressor blade may be coupled to the compressor rotor disk by using a separate coupling device, e.g., a fastener such as a key or a bolt.

The tie rod 100 passes through central portions of the plurality of compressor disks 220. One end of the tie rod 100 is coupled to the farthest upstream compressor disk 220, and the other end is fixed in the torque tube 300.

The combustor 400 mixes introduced compressed air with fuel, combusts the mixture to generate high-temperature and high-pressure combustion gas having high energy, and increases, through an isobaric combustion process, the temperature of the combustion gas to a heat resistant limit temperature at which the parts of the combustor and the turbine can endure.

A combustion system of the gas turbine may include a plurality of combustors arranged in a casing in a cell configuration. Each of the combustors includes a burner including a fuel injection nozzle, etc., a combustor liner forming a combustion chamber, and a transition piece serving as a connector between the combustor and the turbine.

In detail, the liner provides a combustion space in which fuel discharged from the fuel injection nozzle is mixed with compressed air supplied from the compressor and then combusted. The liner may include a flame tube for providing the combustion space in which the fuel mixed with air is combusted, and a flow sleeve for forming an annular space enclosing the flame tube. The fuel injection nozzle is coupled to a front end of the liner, and an ignition plug is coupled to a sidewall of the liner.

The transition piece is connected to a rear end of the liner so as to transfer combustion gas combusted by the ignition plug toward the turbine. An outer wall of the transition piece is cooled by compressed air supplied from the compressor so as to prevent the transition piece from being damaged by high-temperature combustion gas.

To this end, the transition piece has cooling holes through which air can be injected into an internal space of the transition piece. Compressed air cools a main body in the transition piece through the cooling holes and then flows toward the liner.

The cooling air that has cooled the transition piece may flow through the annular space of the liner. Compressed air may be provided as cooling air from the outside of the flow sleeve through cooling holes provided in the flow sleeve, and collide with an outer wall of the liner.

High-temperature and high-pressure combustion gas exiting the combustor 400 is supplied into the above-described turbine 1000. The supplied high-temperature and high-pressure combustion gas expands and collides with an impeller of the turbine so that reaction force is generated in the turbine, thus inducing rotational torque. The obtained rotational torque is transmitted to the compressor 200 via the torque tube 300. Power that exceeds power needed to drive the compressor is used to drive the generator, etc.

The turbine 1000 basically has a structure similar to that of the compressor 200. The turbine 1000 includes a plurality of turbine rotors 1100 which are configured of a plurality of turbine disks 1120 and a plurality of turbine blades 1140.

A plurality of turbine blades 1140 are coupled on an outer surface of each of the plurality of turbine disks 1120. The plurality of turbine disks 1120 are radially provided on an outer circumferential surface of the tie rod 100 and rotated by combustion gas supplied from the combustor 400.

Each turbine blade 1140 is coupled to the corresponding turbine disk 1120 in a coupling manner such as a dovetail coupling manner. A plurality of turbine vanes 1300 fixed to a turbine casing 1200 are provided between the turbine blades 1140 that are provided around the outer circumferential surface of the tie rod 100 in a multi-stage structure. Each of the plurality of turbine vanes 1300 functions to guide the flow of combustion gas that has passed through the corresponding turbine blades 1140.

The plurality of turbine vanes 1300 are formed along a circumferential direction of the turbine casing 1200 in a multi-row structure. It is preferable that the plurality of turbine vanes 1300 be formed such that they sequentially alternate with the turbine blades 1140 along the axial direction of the tie rod 100.

Referring to FIGS. 2 and 3, a turbine blade ring segment 1400 is mounted to an inner surface of the turbine casing 1200. The turbine blade ring segment 1400 functions to prevent leakage of combustion gas and cool the turbine casing 1200.

The turbine blade ring segment 1400 includes an inner panel 1420 and an outer panel 1440. Preferably, a plurality of flow holes 1422 are formed in the inner panel 1420 so that cooling air supplied from the outside of the turbine casing 1200 flows through the plurality of flow holes 1422. Mounting protrusions 1424 are respectively provided on opposite ends of the inner panel 1420 so that the inner panel 1420 can be mounted to the turbine casing 1200 by the mounting protrusions 1424.

Referring to FIGS. 4 and 5, the outer panel 1440 includes a side surface facing a side surface of the inner panel 1420. Thus, the outer panel 1440 is disposed on one surface of the inner panel 1420 and includes a plurality of air passages for communicating with the flow holes 1422 formed in the inner panel 1420. The plurality of air passages includes a first flow passage 1441, a second flow passage 1442, and a third flow passage 1443, which are formed in the outer panel 1440 so as to face the inner panel 1420. A vortex forming space 1444 is further formed in the outer panel 1440 so as to face the inner panel 1420.

The first flow passage 1441 is formed in a central portion of the outer panel 1440 such that cooling air supplied through the flow holes 1422 flows in a flow direction of combustion gas, that is, in the same direction as the flowing combustion gas. The first flow passage 1441 is formed at a position of the outer panel 1440 corresponding to centrally disposed flow holes 1422, that is, those flow holes that are disposed in a central portion of the inner panel 1420. The first flow passage 1441 is formed of a plurality of first flow grooves 1441*a*. Each first flow groove 1441*a* is preferably formed as an elongated groove along the flow direction of the combustion gas, and may include a curved flow passage.

The second flow passage 1442 is formed adjacent to each of side edges of the outer panel 1440. The second flow passage 1442 carries cooling air supplied through edge-disposed flow holes 1422, that is, those flow holes that are disposed at positions other than the centrally disposed flow holes 1422 that communicate with the first flow passage 1441, and guides the supplied cooling air in the same direction as the flowing combustion gas.

Some of the cooling air supplied through the centrally disposed flow holes 1422 flows to the second flow passage 1442 through the third flow passage 1443. One end of the third flow passage 1443 is preferably formed at a position corresponding to the centrally disposed flow holes 1422, with the other end communicating with the second flow passage 1442.

Although it is preferable that the third flow passage 1443 be formed to be inclined in a direction opposite to the combustion gas flow direction, it is not limited to this. As shown in FIGS. 6 and 7, the third flow passage 1443 may be modified to have an approximately triangular or rectangular configuration.

Referring to FIG. 7, the second flow passage 1442 may further include a plurality of second flow grooves 1442*a* and 1442*b*. The second flow groove 1442*b* may be disposed laterally outward from an end of the third flow passage 1443. The second flow groove 1442*b* may not communicate with the third flow passage 1443 and may otherwise have a function analogous to that of the second flow passage 1442*a*. The plurality of second flow grooves 1442*a* and 1442*b* can serve to increase the area of the outer panel 1440 that communicates with the edge-disposed flow holes 1422.

Referring to FIGS. 5 to 7, the vortex forming space 1444 may be formed in the rear end of the outer panel 1440. The vortex forming space 1444 may communicate with the first flow passage 1441 and the second flow passage 1442.

Since the vortex forming space 1444 is formed in the rear end of the outer panel 1440, vortex currents occur in cooling air flowing from a front end of the outer panel 1440 to the rear end so that the flow of cooling air is delayed, whereby the cooling efficiency can be further enhanced.

The turbine disks 1120 are rotating bodies which rotate along with the turbine blades 1140 when the turbine blades 1140 are rotated by combustion gas. The turbine vane 1300 are fixed on the turbine casing 1200, i.e., are stationary bodies which remain stationary regardless of the rotation of the turbine blades 1140. When passing through the turbine blades 1140, combustion gas pushes the turbine blades 1140. When combustion gas pushes the turbine blades 1140, the turbine blades 1140 and the turbine disks 1120 rotate with the tie rod 100 functioning as a center axis. The flow direction of the combustion gas that has passed through the turbine blades 1140 is guided by the turbine vanes 1300, and then the combustion gas is discharged out of the gas turbine 10 through the diffuser 10*b*.

As described above, in the present disclosure, a flow passage along which cooling air supplied from the outside flows is improved so that cooling air can flow over the overall surface of the outer panel 1440 along the flow direction of combustion gas without collision, and vortex currents occur in the cooling air that flows around the rear end of the outer panel 1440, whereby the flow of cooling air is delayed. Consequently, the cooling efficiency can be further enhanced.

While the present disclosure has been described with respect to the specific embodiments, the present disclosure is not to be limited to the disclosed embodiments and it will be apparent to those skilled in the art that various changes and modifications may be made without departing from the spirit and scope of the disclosure as defined in the following claims.

What is claimed is:

1. A turbine blade ring segment comprising:
   an inner panel configured to be mounted to an inner surface of a turbine casing for receiving turbine blades to be rotated by combustion gas supplied from a combustor, the inner panel including a plurality of flow holes for supplying cooling air from an outside of the turbine casing, the plurality of flow holes including centrally disposed flow holes disposed in a central portion of the inner panel; and
   an outer panel disposed on one surface of the inner panel, the outer panel including a plurality of air passages for communicating with the plurality of flow holes formed in the inner panel, the plurality of air passages including:
     a first flow passage formed in a central portion of the outer panel and configured to guide the supplied cooling air in a flow direction of the combustion gas, a second flow passage formed in the outer panel separately from the first flow passage and configured to guide the supplied cooling air in the flow direction of the combustion gas, and a third flow passage communicating with the second flow passage to feed the supplied cooling air to the second flow passage, wherein the first flow passage comprises:
a plurality of flow grooves each including one end formed at a position corresponding to the centrally disposed flow holes and another end communicating with a vortex forming space, and
a curved flow passage formed at the one end,
wherein each flow groove of the plurality of flow grooves includes an elongated groove arranged along the flow direction of the combustion gas and connected between the curved flow passage and the vortex forming space.

2. The turbine blade ring segment according to claim 1, wherein the plurality of flow holes are arranged throughout the one surface of the inner panel, and the second and third flow passages comprise a second plurality of flow grooves each including one end formed at a position corresponding to a separate area of the one surface of the inner panel.

3. The turbine blade ring segment according to claim 1, wherein the plurality of flow holes are arranged throughout the one surface of the inner panel, and the cooling air guided by the first flow passage is supplied to the first flow passage through the centrally disposed flow holes among the plurality of flow holes.

4. The turbine blade ring segment according to claim 3, wherein the cooling air guided by the second flow passage is supplied to the second flow passage through edge-disposed flow holes among the plurality of flow holes.

5. The turbine blade ring segment according to claim 4, wherein the cooling air fed by the third flow passage is supplied to the third flow passage through a portion of the centrally disposed flow holes.

6. The turbine blade ring segment according to claim 1, wherein the second flow passage is formed adjacent to a side edge of the outer panel.

7. The turbine blade ring segment according to claim 6,
wherein the plurality of flow holes are arranged throughout the one surface of the inner panel, and
wherein the third flow passage includes a first end formed at a position corresponding to the centrally disposed flow holes among the plurality of flow holes, and a second end communicating with the second flow passage.

8. The turbine blade ring segment according to claim 1,
wherein the plurality of flow holes further include edge-disposed flow holes disposed in an edge portion of the inner panel at positions other than the centrally disposed flow holes, and
wherein the second flow passage comprises at least one flow groove including one end formed at a position corresponding to the edge-disposed flow holes and another end communicating with the vortex forming space.

9. The turbine blade ring segment according to claim 1, wherein the plurality of air passages respectively communicate with the vortex forming space formed in a rear end of the outer panel.

10. A turbine configured to pass combustion gas supplied from a combustor through an interior of the turbine to generate a driving force, the turbine comprising:

a turbine rotor configured to be rotated by the combustion gas, the turbine rotor including a plurality of turbine disks and a plurality of turbine blades coupled to an outer surface of each of the plurality of turbine disks;
a turbine casing for housing the turbine rotor; and
a turbine blade ring segment comprising:
an inner panel configured to be mounted to an inner surface of the turbine casing, the inner panel including a plurality of flow holes for supplying cooling air from an outside of the turbine casing, the plurality of flow holes including centrally disposed flow holes disposed in a central portion of the inner panel; and
an outer panel disposed on one surface of the inner panel, the outer panel including a plurality of air passages for communicating with the plurality of flow holes formed in the inner panel, the plurality of air passages including a first flow passage formed in a central portion of the outer panel and configured to guide the supplied cooling air in a flow direction of the combustion gas, a second flow passage formed in the outer panel separately from the first flow passage and configured to guide the supplied cooling air in the flow direction of the combustion gas, and a third flow passage communicating with the second flow passage to feed the supplied cooling air to the second flow passage,
wherein the first flow passage comprises:
a plurality of flow grooves each including one end formed at a position corresponding to the centrally disposed flow holes and another end communicating with a vortex forming space, and
a curved flow passage formed at the one end,
wherein each flow groove of the plurality of flow grooves includes an elongated groove arranged along the flow direction of the combustion gas and connected between the curved flow passage and the vortex forming space.

11. The turbine according to claim 10, wherein the plurality of flow holes are arranged throughout the one surface of the inner panel, and the second and third flow passages comprise a second plurality of flow grooves each including one end formed at a position corresponding to a separate area of the one surface of the inner panel.

12. The turbine according to claim 10,
wherein the plurality of flow holes are arranged throughout the one surface of the inner panel, and the cooling air guided by the first flow passage is supplied to the first flow passage through the centrally disposed flow holes among the plurality of flow holes,
wherein the cooling air guided by the second flow passage is supplied to the second flow passage through edge-disposed flow holes among the plurality of flow holes, and
wherein the cooling air fed by the third flow passage is supplied to the third flow passage through a portion of the centrally disposed flow holes.

13. A gas turbine comprising:
a compressor to draw air and compress the drawn air;
a combustor to generate combustion gas by combusting fuel mixed with the compressed air; and
a turbine comprising
a turbine rotor configured to be rotated by the combustion gas, the turbine rotor including a plurality of turbine disks and a plurality of turbine blades coupled to an outer surface of each of the plurality of turbine disks;
a turbine casing for housing the turbine rotor; and a turbine blade ring segment comprising:
an inner panel configured to be mounted to an inner surface of the turbine casing, the inner panel including a plurality of flow holes for supplying cooling air from an outside of the turbine casing, the plurality of flow holes including centrally disposed flow holes disposed in a central portion of the inner panel; and
an outer panel disposed on one surface of the inner panel, the outer panel including a plurality of air passages for communicating with the plurality of flow holes formed in the inner panel, the plurality of air passages including a first flow passage formed in a central portion of the outer panel and configured to guide the supplied cooling air in a flow direction of the combustion gas, a second flow passage formed in the outer panel separately from the first flow passage and configured to guide the supplied cooling air in the flow direction of the combustion gas, and a third flow passage communicating with the second flow passage to feed the supplied cooling air to the second flow passage,
wherein the first flow passage comprises:
a plurality of flow grooves each including one end formed at a position corresponding to the centrally disposed flow holes and another end communicating with a vortex forming space, and
a curved flow passage formed at the one end,
wherein each flow groove of the plurality of flow grooves includes an elongated groove arranged along the flow direction of the combustion gas and connected between the curved flow passage and the vortex forming space.

* * * * *